United States Patent [19]
Daumueller

[11] Patent Number: 5,735,596
[45] Date of Patent: Apr. 7, 1998

[54] HEADLAMP FOR VEHICLES

[75] Inventor: Hans Daumueller, Bodelshausen, Germany

[73] Assignee: Robert Bosch GmbH, Stuttgart, Germany

[21] Appl. No.: 551,853

[22] Filed: Nov. 7, 1995

[30] Foreign Application Priority Data

Dec. 8, 1994 [DE] Germany ............ 44 43 682.3

[51] Int. Cl.$^6$ .................................. F21V 31/02
[52] U.S. Cl. ............... 362/267; 362/61; 362/311; 362/374; 362/375
[58] Field of Search ............. 362/61, 267, 374, 362/375, 80, 310, 311, 362

[56] References Cited

U.S. PATENT DOCUMENTS

| | | | |
|---|---|---|---|
| 3,761,957 | 9/1973 | Jarrett | 362/311 |
| 4,128,864 | 12/1978 | Brussee et al. | 362/80 |
| 4,574,338 | 3/1986 | Takasaki et al. | 362/61 |
| 4,695,928 | 9/1987 | Schauwecker et al. | 362/61 |
| 5,113,320 | 5/1992 | Haydu | 362/80 |
| 5,113,331 | 5/1992 | Nagengast | 362/267 |
| 5,180,219 | 1/1993 | Geddie | 362/61 |

FOREIGN PATENT DOCUMENTS

| | | | |
|---|---|---|---|
| 499044 | 8/1992 | European Pat. Off. | 362/362 |
| 3030427 | 12/1980 | Germany . | |
| 4140362 | 1/1993 | Germany | 362/311 |

Primary Examiner—Alan Cariaso
Attorney, Agent, or Firm—Michael J. Striker

[57] ABSTRACT

The headlamp has a housing (10) to whose front edge there is a fastened a transparent cover (20) made of plastic. The cover (20) has a surrounding edge region (42) over whose front end it comes to bear against the housing (10). Formed, in a manner such that it surrounds the edge region (42) with clearance, on the cover (20) is an outer edge (46), the free end of which points counter to the assembly direction (17) of the cover (20), which outer edge is elastically deformable toward the edge region (42) and has a plurality of outwardly protruding lugs (48) distributed over the circumference of the cover (20). A wall (28), surrounding the outer edge (46), of the housing (10) has a plurality of recesses (32) which are distributed over its circumference and into which the lugs (48) are latched. The outer edge (46) thus forms a stable latching element and, in addition, causes the cover (20) to be highly rigid.

11 Claims, 2 Drawing Sheets

HEADLAMP FOR VEHICLES

PRIOR ART

The invention proceeds from a headlamp for vehicles according to the generic type of claim 1.

A headlamp of this type is disclosed by DE 30 427 A11. This headlamp has a housing, the light exit opening of which is covered by a transparent plastic cover. The cover is fastened to the housing by means of a latching connection and has, distributed over its circumference, a plurality of latching elements which are deformable elastically transversely with respect to the assembly direction of said cover and are in the form of spring hooks which latch on part of the housing. The spring hooks protrude from the edge of the cover in the assembly direction and project into the housing. The spring hooks can easily be damaged during assembly of the cover. In addition, under some circumstances the cover has only low torsional rigidity and consequently does not take up the required position when fastened to the housing.

ADVANTAGES OF THE INVENTION

The headlamp, according to the invention, for vehicles with the defining features of claim 1 has, in contrast, the advantage that the risk of the at least one latching element being damaged is substantially reduced since said element does not protrude in the assembly direction. In addition, the torsional rigidity of the cover is increased by the outer edge.

The dependent claims specify advantageous developments and improvements of the invention. Particularly high torsional rigidity of the cover is achieved by means of the design as claimed in claim 4. The design as claimed in claim 8 has the advantage that the covering element is held on the cover without particular further measures.

DRAWING

Three exemplary embodiments of the invention are illustrated in the drawing and explained in more detail in the following description. FIG. 1 shows a headlamp for vehicles in a vertical longitudinal section in accordance with a first exemplary embodiment, FIG. 2 shows the front view of the headlamp, FIG. 3 shows a detail, designated in FIG. 1 by III, of the headlamp in accordance with a secondary exemplary embodiment, FIG. 4 shows a perspective illustration of a cover of the headlamp, and FIG. 5 shows the detail III with a fourth exemplary embodiment of the headlamp.

DESCRIPTION OF THE EXEMPLARY EMBODIMENTS

Figure 1:
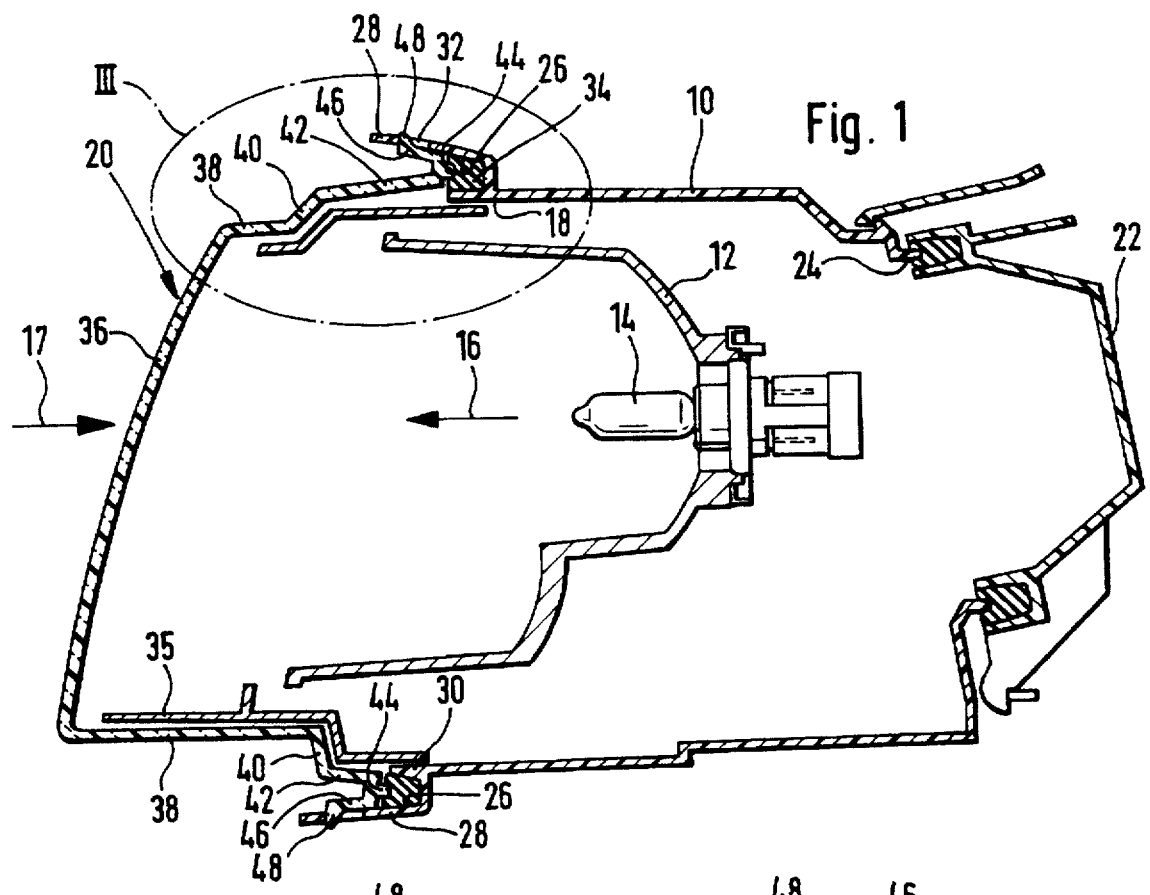

A headlamp, illustrated in FIGS. 1 to 5, for vehicles, in particular motor vehicles, is fastened in a vehicle body (not shown). The headlamp has a housing 10 which is preferably made of plastic and in which there is arranged at least one reflector 12 into which a light source 14 is inserted. At its front side, which points in the light exit direction 16, the housing 10 has a light exit opening 18 which is covered by a transparent cover 20. The cover 20 is made of plastic, in particular thermoplastic. At its rear end the housing 10 has an opening 24 which can be closed by a cap 22.

At its front edge, which surrounds the light exit opening 18, the housing 10 has a surrounding annular groove 26 which is open in the light exit direction 16. That wall 28 of the housing 10 which outwardly bounds the annular groove 26 protrudes, in the light exit direction 16, over the inner wall 30 of the annular groove 26 and forms a flange. The wall 28 runs in a divergent manner in the light exit direction 16, i.e. the cross section enclosed by the wall 28 widens in the light exit direction 16. The wall 28 is elastically deformable outward transversely with respect to the light exit direction 16. The wall 28 has, distributed over its circumference, plurality of recesses 32 in the form of openings. Arranged in the annular groove 26 is an elastically deformable sealing element 34 which is formed as a surrounding ring. In the housing 10 there is arranged a covering device 35 by means of which a gap between the front edge of the reflector 12 and the inside of the housing 10 is at least partially covered.

The cover 20 has a main region 36 which extends transversely with respect to the assembly direction 17 of the cover, which direction is opposed to the light exit direction 16, and adjoining which main region, in the assembly direction 17 toward the housing 10, is an annular, surrounding region 38. Adjoining the annular region 38 is an outwardly directed step 40 and adjoining this, continuing in the assembly direction 17, is a surrounding edge region 42. The cover 20 bears over the front end of the edge region 42 against the sealing element 34, it being possible for a surrounding projection 44 to protrude out of the front end of the edge region 42, which projection penetrates into the sealing element 34 with elastic deformation of the latter. From that end of the edge region 42 which points toward the housing 10 there protrudes, counter to the assembly direction 17 and pointing away from the housing 10, an outer edge 46 which, viewed in a direction transversely with respect to the assembly direction 17, runs with clearance from the edge region 42. That end region of the cover 20 which points toward the housing 10 is hence, as viewed in longitudinal section, of approximately U-shaped design, the inner limb of the U shape being formed by the edge region 42 and the outer limb being formed by the outer edge 46. The free end of the outer edge 46 points counter to the assembly direction 17 and the outer edge 46 runs counter to the assembly direction 17 in a divergent manner, i.e. the cross section enclosed by the outer edge 46 increases counter to the assembly direction 17.

Figure 2:
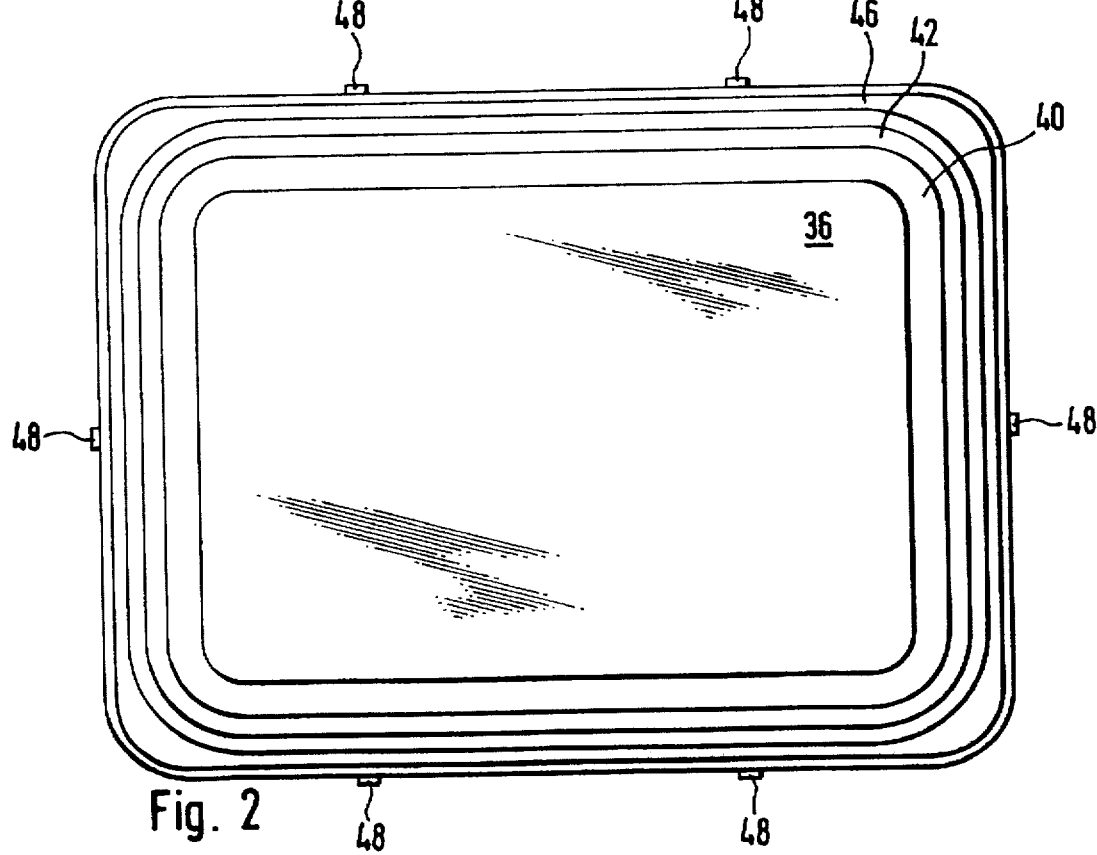

The outer edge 46 is formed over the entire circumference of the cover 20 and has a plurality of lugs 48 which are arranged distributed over its circumference and protrude outward from the latter. The surrounding outer edge 46 causes the cover 20 to have high torsional rigidity. As FIG. 2 shows, for example two lugs 48 are arranged in each case in the upper and lower circumferential region of the outer edge 46 and one lug 48 is arranged in each of the lateral circumferential regions. Those edges of the lugs 48 which point in the assembly direction 17 are beveled, as FIG. 1 illustrates, and those edges of the lugs 48 which point counter to the assembly direction 17 are arranged approximately perpendicularly with respect to the longitudinal extent of the outer edge 46. The outer edge 46 is elastically deformable transversely with respect to the assembly direction 17, in particular inward toward the edge region 42.

To assemble the cover 20 the latter is pushed, with its edge region 42 in the assembly direction 17, into the region enclosed by the outer wall 28 of the housing 10. The outer edge 46 enters between the wall 28, the lugs 48 sliding with their sloping edges on the wall 28. In the process, the outer edge 46 is pressed, with elastic deformation, inward toward the edge region 42 and the wall 28 is pressed outward with elastic deformation. After a certain assembly path the front end of the edge region 42 comes to bear against the sealing element 34, and by elastic deformation of the sealing element 34 the cover 20 can be pushed a little further in the assembly direction 17. In the end position of the cover 20 the lugs 48 latch in the recesses 32 in the wall 28 with the result that the cover 20 is fastened in a latching manner to the housing 10. The outer edge 46, together with the lugs 48, thus forms a latching element which points with its free end counter to the assembly direction 17 of the cover 20 and which latches on the wall 28 of the housing 10. As a result of the fact that the outer edge 46 is formed over the entire circumference of the cover 20, it has high rigidity and thus can only be damaged under the action of a high degree of force. To remove the cover 20 the lugs 48 have to be pressed inward toward the edge region 42 so that they are no longer arranged in the recesses 32, and then the cover 20 can be removed in the light exit direction 16.

Figure 3:
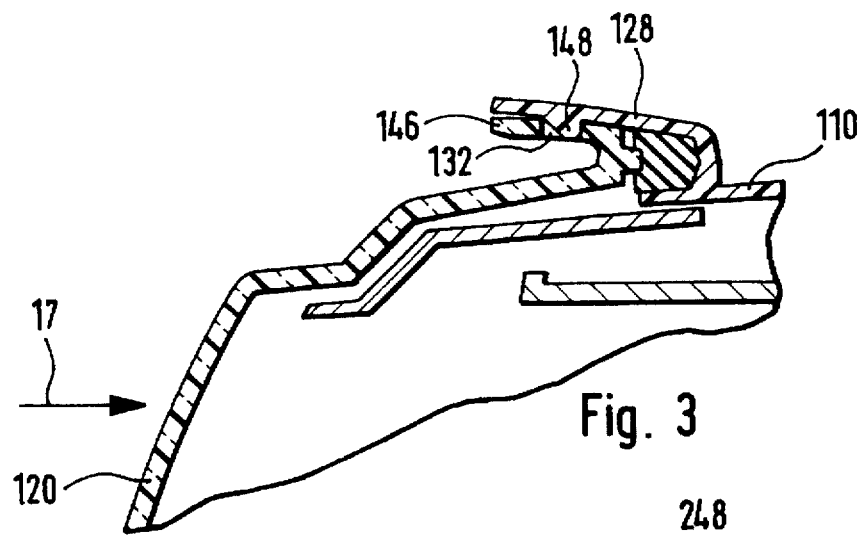

FIG. 3 illustrates a detail of the headlamp in accordance with a second exemplary embodiment, in which the headlamp is essentially of the same design as in the first exemplary embodiment and merely the arrangement of the lugs and recesses forming the latching connection is changed around. The outer edge 146 of the cover 120 has a plurality of recesses 132 distributed over its circumference, and a plurality of lugs 148 protrude from the wall 128 of the housing 110 inward toward the outer edge 146, distributed over the circumference of said outer edge. Those edges of the lugs 148 which point counter to the assembly direction 17 are beveled and those edges of the lugs 148 which point in the assembly direction 17 are arranged approximately perpendicularly with respect to the wall 128. During assembly of the cover 120 the latter is pushed, in the assembly direction 17, into the front edge of the housing 110, the lugs 148 of the wall 128 sliding onto the outer edge 126 with the result that the latter is pressed elastically inward to the edge region 142 and the wall 128 is pressed elastically outward. In the end position of the cover 120 the lugs 148 latch in the recesses 132 in the outer edge 146 with the result that the cover 120 is held.

Figure 4:
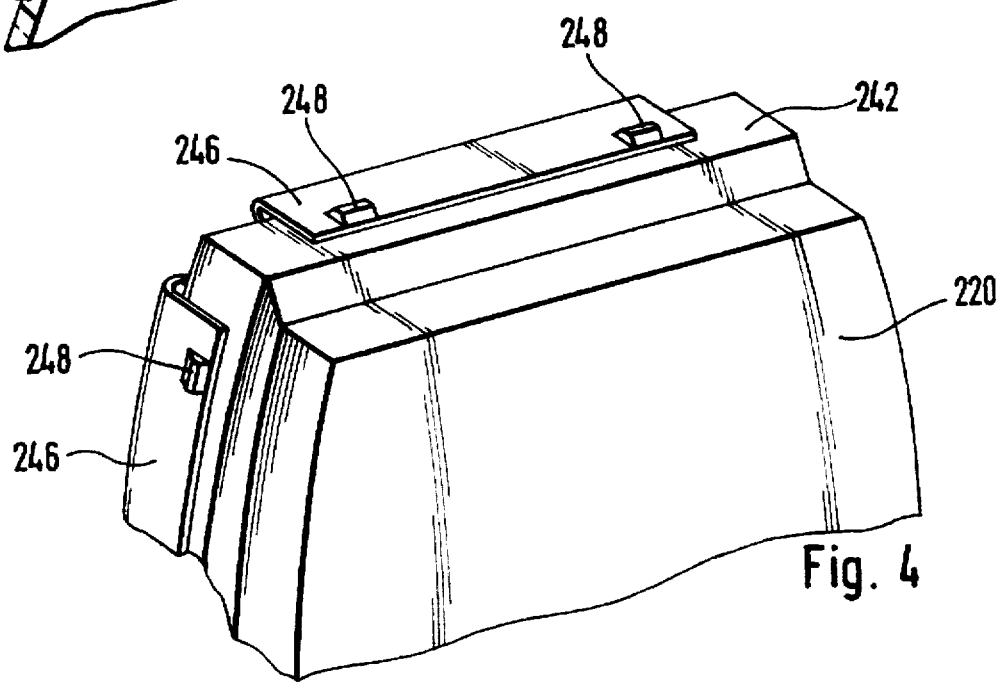

FIG. 4 illustrates a detail of the cover 220 of the headlamp in accordance with a third exemplary embodiment. In this case, the headlamp is essentially of the same design as described above for the first or second exemplary embodiment, the outer edge 246, which surrounds the edge region 242, however, not being formed over the entire circumference of the cover 220 but rather is distributed only at various points over the circumference of the cover 220. In particular, the outer edge 246 is formed over the upper and lower edge as well as over the side edges of the cover 220 but not in the corner regions of the cover 220. Each portion of the outer edge 246 then has one or more lugs 248 for the latching connection. In general, the outer edge 246 is formed at least at those points at which the latching connection of the cover 220 is to take place, i.e. the lug 248 or the recess are present.

Figure 5:
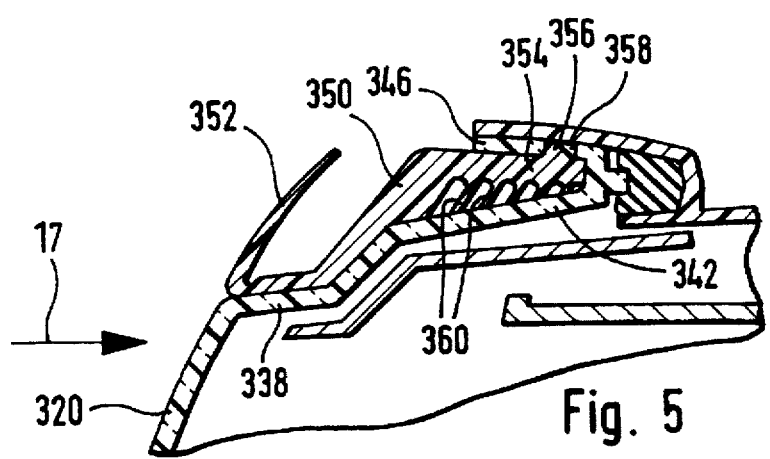

FIG. 5 illustrates a detail of the headlamp from FIG. 1 in accordance with a fourth exemplary embodiment, the headlamp essentially being of the same design as described above. A covering element 350 is additionally provided which surrounds the cover 320 at least over part of its circumference. The covering element 350 is matched to the contours of the circumference of the cover 320 and at its front edge region which points counter to the assembly direction 17 has an elastically deformable collar 352 which protrudes outward from the annular region 338 of the cover 320 and serves to cover a gap between the cover 320 and the components adjacent to said cover on insertion of the headlamp in the vehicle. With its edge 354 which points in the assembly direction 17 the covering element 350 is pushed into the clearance present between the edge region 342 and the outer edge 346 of the cover 320 and is held there. From the edge 354 of the covering element 350 there protrude outward, toward the outer edge 346, a plurality of lugs 356 which are distributed over the circumference of said outer edge and engage in corresponding recesses 358 in the outer edge 346 with the result that the covering element 350 is held in a latching manner on the cover 320. The edge 354 of the covering element 350 has, toward the edge region 342 of the cover 320, a plurality of ribs 360 which are arranged spaced apart from one another in the assembly direction 17 and bear with their front ends against the edge region 342. By deformation of the ribs 360 the edge 354 of the covering element 350 is elastically compressible, the ribs 360, with the edge 354 arranged in the clearance, being deformed elastically and pressing the lugs 356 into the recesses 358. Apart from the recesses 358 no further, additional measures are required on the cover 320 for fastening the covering element 350.

I claim:

1. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, said outer edge being formed over the entire circumference of said cover.

2. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, said housing part having a recess, said outer edge of said cover having at least one outwardly protruding lug which latches in said recess of said housing part.

3. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, said outer edge of said cover having at least one recess, said housing part having a lug latching into said recess.

4. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, said clearance is formed between an outer circumference of said edge region and in an inner circumference of said outer edge of said cover; and a covering element arranged in said clearance and surrounding said cover at least over part of the circumference of said cover.

5. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, and means forming a latching connection which holds said cover element in said outer edge.

6. A headlamp for vehicles, comprising a housing having a light exit opening; a transparent cover having at least one latching element for latching on a part of said housing, at least one of said latching element and said part of said housing being elastically deformable with respect to an assembly direction of said cover, said cover having a surrounding edge region bearing at least indirectly against said housing, said cover also having an outer edge which surrounds said edge region with clearance at least over a part of a circumference of said cover, said outer edge having a free end which points counter to the assembly direction and serves as said latching element, said covering element having a region arranged in said clearance and elastically compressed.

7. A headlamp as defined in claim 1, wherein said cover is formed as a transparent plastic cover.

8. A headlamp as defined in claim 1, wherein said outer edge rune in a divergent manner counter to the assembly direction of said cover.

9. A headlamp as defined in claim 1; and further comprising an elastically deformable sealing element arranged between an end side of said edge region of said cover and said housing.

10. A headlamp as defined in claim 1, wherein said outer edge has a plurality of portions distributed over the circumference of said cover.

11. A headlamp as defined in claim 6, wherein said region of said covering element which is arranged in said clearance has elastically deformable ribs which extend transversely with respect to said edge region.

* * * * *